United States Patent
Shindo et al.

[11] Patent Number: 6,048,095
[45] Date of Patent: Apr. 11, 2000

[54] EXTERNAL CONNECTION MECHANISM OF TEMPERATURE-MEASURING TYPE FOR PRINTED CIRCUIT BOARD

[75] Inventors: Tsutomu Shindo; Kenjiro Hamada, both of Tokyo, Japan

[73] Assignee: Ohkura Electric Co., Ltd., Tokyo, Japan

[21] Appl. No.: 09/011,945
[22] PCT Filed: Aug. 11, 1997
[86] PCT No.: PCT/JP97/02804
§ 371 Date: Feb. 23, 1998
§ 102(e) Date: Feb. 23, 1998
[87] PCT Pub. No.: WO99/08494
PCT Pub. Date: Feb. 18, 1999

[51] Int. Cl.⁷ .................................................... G01K 1/14
[52] U.S. Cl. ........................................... 374/208; 374/182
[58] Field of Search ................................. 374/178, 185, 374/208, 182

[56] References Cited

U.S. PATENT DOCUMENTS

| | | | |
|---|---|---|---|
| 4,456,919 | 6/1984 | Tomita et al. | 374/178 |
| 4,718,777 | 1/1988 | Mydynski et al. | 374/182 |
| 4,859,080 | 8/1989 | Titus et al. | 374/2 |
| 5,213,417 | 5/1993 | Yamada et al. | 374/208 |
| 5,230,564 | 7/1993 | Bartilson et al. | 374/178 |

FOREIGN PATENT DOCUMENTS

| | | | |
|---|---|---|---|
| 2730764 | 1/1979 | Germany | 374/185 |
| 3010131 | 1/1991 | Japan | 374/185 |

*Primary Examiner*—Edward H. Tso
*Assistant Examiner*—Pia Tibbits
*Attorney, Agent, or Firm*—Iandiorio & Teska

[57] ABSTRACT

An external connection mechanism of a printed-circuit board 1 has a U-shaped elastic metal piece 2 having two parallel legs adapted to receive one edge of a printed-circuit board 1 therebetween. An insulating terminal base 3 holds both the metal piece 2 and an electric terminal 4 while keeping them in contact. The printed-circuit board 1 carries a temperature sensor 13 which is connected to a temperature-responsive circuit of the board 1. A contact lug 6 is formed by bending one of the two legs so as to be engageable with a conductive portion of the board 1, and a temperature-measuring station 7 is formed by bending root portion of the other one of the two legs toward close vicinity of the electric terminal 4 so as to be engageable with the temperature sensor 13. When the board 1 is received by the metal piece 2, the contact lug 6 engages the conductive portion of the board 1 so as to bring the electric terminal 4 into operative contact with the printed-circuit board 1 and the temperature sensor 13 engages the temperature-measuring station 7 so as to measure temperature substantially at the electric terminal 4.

13 Claims, 3 Drawing Sheets

(B)

(A)

(C)

(D)

EXTERNAL CONNECTION MECHANISM OF TEMPERATURE-MEASURING TYPE FOR PRINTED CIRCUIT BOARD

TECHNICAL FIELD

This invention relates to an external connection mechanism of temperature-measuring type for a printed-circuit board. In particular, the invention relates to mechanism of an external connection terminal for a printed-circuit board which terminal is thermally connected to a temperature-detecting means and is capable of acting as the reference junction of a thermocouple connected thereto.

BACKGROUND ART

Referring to FIG. 4, when a thermocouple 20 is used for temperature-measurement, one end of a first metal 21 and one end of a second metal 22 are joined to form a temperature-sensing junction 23. The temperature-sensing junction 23 is disposed, for instance, at a measuring point of a process 25. The opposite ends of the first and second metals 21 and 22 are connected to, for instance, a control circuit 26 through terminals 4a, 4b (sometimes, jointly referred to as terminals 4, hereinafter) of a measuring instrument 10. In this case, the opposite ends of the metals 21, 22 form a reference junction 24. If the terminals 4 are kept at the same temperature and joined to the opposite ends of the two metals 21 and 22 through the same electric conductors, then it has been theoretically proved that such terminals 4 are equivalent to a reference junction 24 wherein the opposite ends of the metals 21 and 22 are directly joined, as far as the temperature measurement is concerned. In practice, the relationship between the temperature difference and the thermoelectromotive force (temf) across the measuring junction 23 and the reference junction 24 is given for each of different type thermocouples by a Standard under the condition that the reference junction 24 is kept at 0° C.; for instance, Japanese Industrial Standard (JIS) 1602 gives a temf of 41.276 mV for temperature of 1,000° C. at the measuring junction 23 of a K thermocouple.

In actual measurement, the temperature of the reference junction 24 is that of the terminals 4, and the temf deviates from the value of Standard by such an amount which is determined as a temf between the temperature of the terminals 4 and 0° C. reference junction. For instance, in the case of the above K thermocouple, if both of the terminals 4 are at 20° C., the temf of the terminals 4 for the measuring junction 23 at 1,000° C. will be 40.478 (=41.276−0.798) mV, but not 41.276 mV, and accurate measurement cannot be effected. If, however, the temperature of the terminals 4 is measured and found to be 20° C., a temf deviation of 0.798 mV for the temperature difference of 0° C. to 20° C. can be determined from JIS 1602, and the measured temf can be compensated or corrected for 0° C., i.e., to 41.276 (=40.478+0.798) mV, and the measuring junction temperature of 1,000° C. can be correctly measured.

The above correction for the temperature of the terminals 4 connected to the reference junction of a thermocouple is usually referred to as the "reference junction compensation".

The temperature of the terminals 4 connected to the reference junction 24 varies depending on the temperature of a room where the measuring instrument 10 carrying the terminals 4 is located. To cope with changes in the room temperature, it has been tried to mount a temperature-sensing element 13 on a terminals-holding portion 16 of the measuring instrument 10, as shown in FIG. 2, and temperatures of a number of terminals 4 are represented by a measured value of the temperature sensor 13 mounted on the terminal-holding portion 16. In response to change in such measured value from the temperature sensor 13, the reference junction compensation has been carried out in the above-mentioned manner for the reference junction 24 of the thermocouple 20. A conventional arrangement of FIG. 3 uses a collective terminal rack 14 which is thermally separated from the body of the measuring instrument 10, so that heat generated in the instrument 10 should not affect the temperature of the terminal 4. Further, a heat-dissipating plate 15 with a temperature sensor 13 is mounted on the rack 14. After dissipating heat, the temperature distribution on the heat-dissipating plate 15 becomes substantially uniform, and the temperatures of a number of terminals 4 are represented by the measured value of the one temperature sensor 13.

On the other hand, with the trend of miniaturization of instruments and high-density loading of elements thereon, the number of printed-circuit boards per instrument has increased, and power consumption by elements on one printed-circuit board 1 has also increased. Further the density of elements on individual printed-circuit boards has increased, too. As a result, temperature gradient is caused inside the instrument, and if a large number of terminals 4 are mounted directly on a housing 12 as shown in FIG. 2, the temperature of terminals 4 at higher parts of vertical rows may be different from that of those at lower parts of the vertical rows.

In such cases, it is difficult to make accurate compensation for actual temperature variation at the reference junction 24 of a thermocouple 20 by means of a single temperature sensor 13 of FIG. 2 or a combination of such temperature sensor 13 and a heat-dissipating plate 15 of FIG. 3. Consequently, there has been a problem of increased error in temperature measurement by thermocouple with the advance of miniaturization of instrument and intensification of element loading thereon.

In the case of a separate-type collective terminal rack 14 of FIG. 3, the overall dimension of instrument tends to expand, resulting in a cost increase, in addition to the above-mentioned accuracy limitation in reference junction compensation due to the use of a single temperature sensor in common for many terminals.

DISCLOSURE OF INVENTION

Therefore, an object of the present invention is to provide an external connection mechanism of temperature-measuring type for printed-circuit board. The mechanism facilitates temperature measurement of each electric terminal therein so as to enable, for instance, the reference junction compensation for a thermocouple connected thereto on the basis of individual terminal temperature.

An external connection mechanism of temperature-measuring type according to the invention has a U-shaped resilient metal piece having two parallel legs adapted to receive one edge of a printed-circuit board. An insulating terminal base holds both the metal piece and an electric terminal while keeping them in contact with each other. The printed-circuit board carries a temperature sensor at the one edge of the board, and the output of the temperature sensor is connected to a temperature-responsive circuit of the board. A contact lug is formed by bending one of the two legs of the metal piece so as to be engageable with a conductive portion of the printed-circuit board, and a temperature-measuring station is formed by bending root portion of the other one of the two legs proximate the electric terminal so as to be engageable with the temperature sensor. When the printed-circuit board is received by the metal piece, the contact lug engages the conductive portion of the printed-circuit board so as to bring the electric terminal into operative contact with the conductive portion of the printed-circuit board and the temperature sensor engages the temperature-measuring station for measuring temperature substantially at the electric terminal.

BRIEF DESCRIPTION OF DRAWINGS

For a better understanding of the invention, reference is made to the accompanying drawings, in which.

BEST MODE FOR CARRYING OUT THE INVENTION

Figure 1:
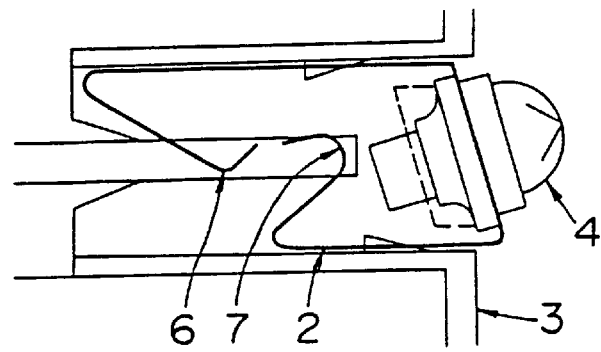
FIGS. 1(A)–(D) show different partial views of the essential portion of an external connection mechanism for a printed-circuit board according to the invention.
Figure 1:
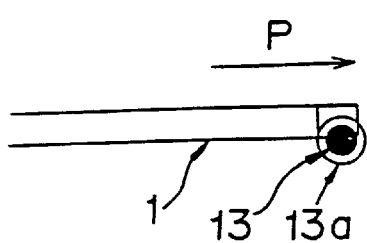
Figure 1:
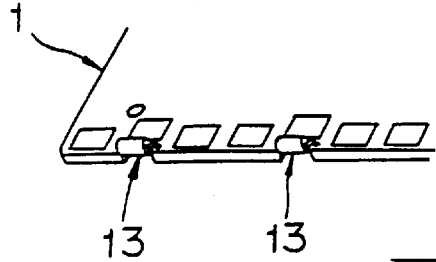
Figure 1:
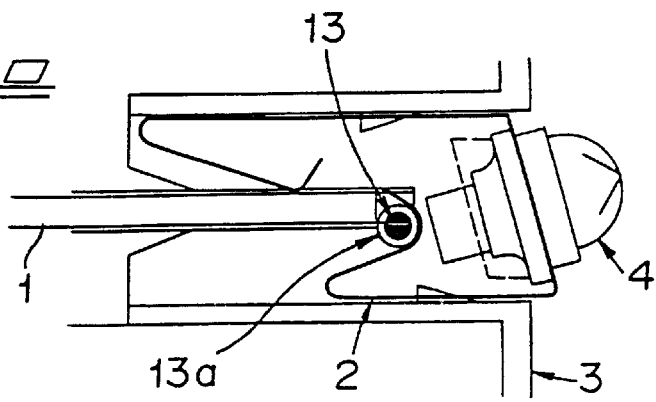
Figure 2:
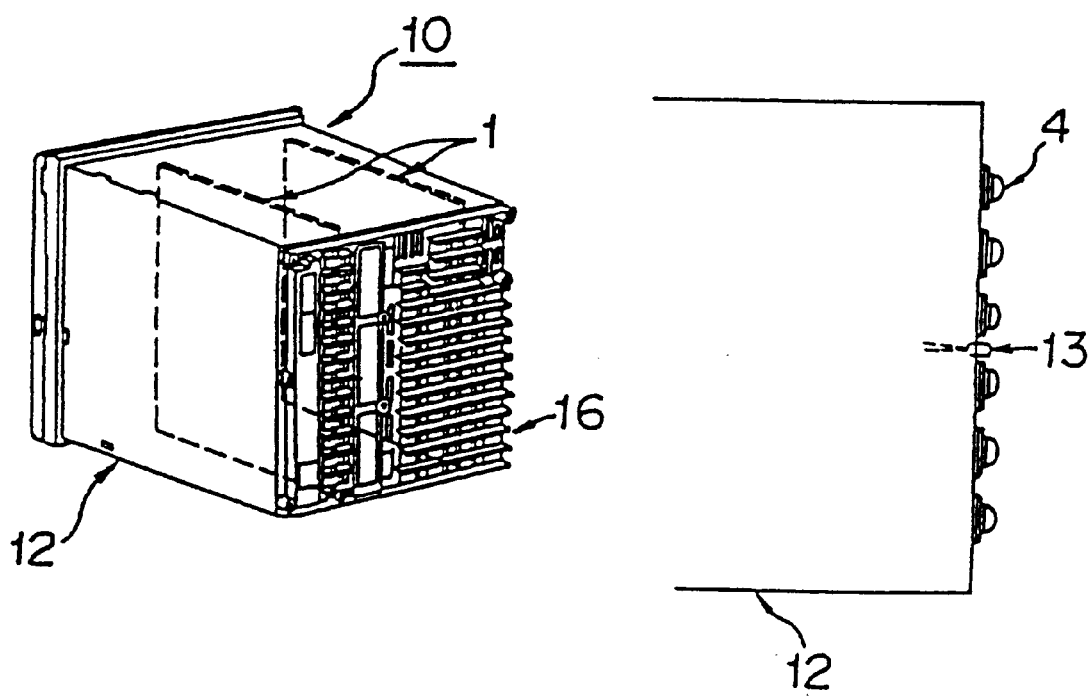
FIG. 2 is a diagrammatic illustration of external connection terminals of a conventional measuring device.
Figure 3:
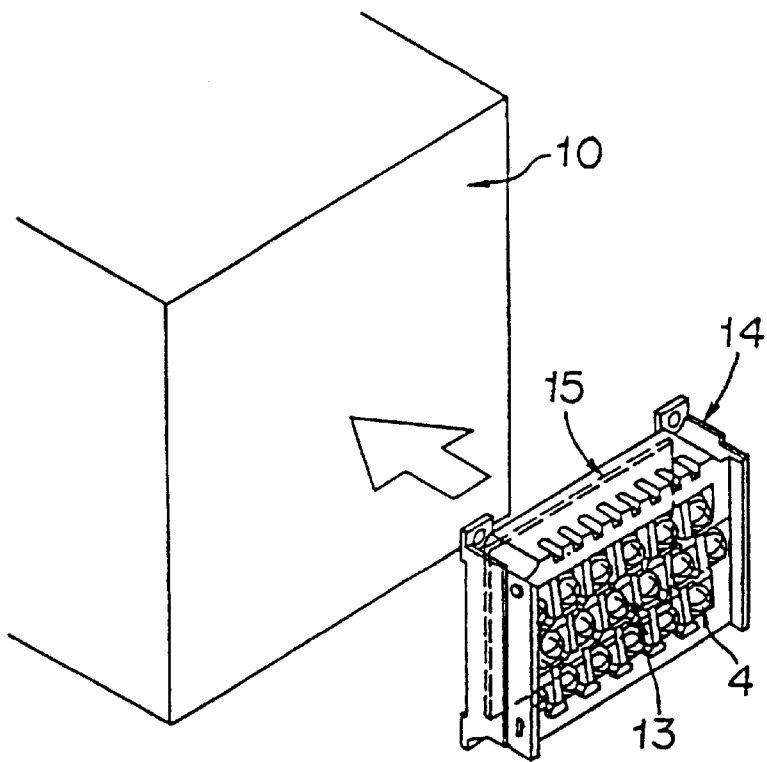
FIG. 3 is a schematic perspective view of a conventional collective terminal rack.

Referring to FIG. 1, an external connection terminal mechanism of temperature-measuring type according to the invention uses a U-shaped resilient metal piece 2 with two parallel legs adapted to receive one edge of a printed-circuit board 1. An insulating terminal base 3 holds both the metal piece 2 and an electric terminal 4 in contact with each other. Thus, when an external lead wire (not shown) is mechanically fastened to and electrically connected to the terminal 4, such lead wire is also electrically connected to the metal peace 2. The printed-circuit board 1 carries a temperature sensor 13 at that one edge of the board 1 which is receivable between the two parallel legs of the metal piece 2. The output of the temperature sensor 13 is connected to a temperature-responsive circuit (not shown) of the board 1. Tip portion of one of the two legs of the metal piece 2 is bent so as to form a contact lug 6 which is engageable with a conductive portion of the board 1, and the root portion of the other one of the two legs of the metal piece 2 is bent proximate the electric terminal 4 so as to form a temperature-measuring station 7 which is engageable with the temperature sensor 13. When a printed-circuit board 1 is received by the metal piece 2, the contact lug 6 engages the conductive portion of the printed-circuit board 1 so as to bring the electric terminal 4 into operative contact with the printed-circuit board 1 and the temperature sensor 13 engages the temperature-measuring station 7 so as to measure the temperature substantially at the electric terminal 4.

Figure 4:
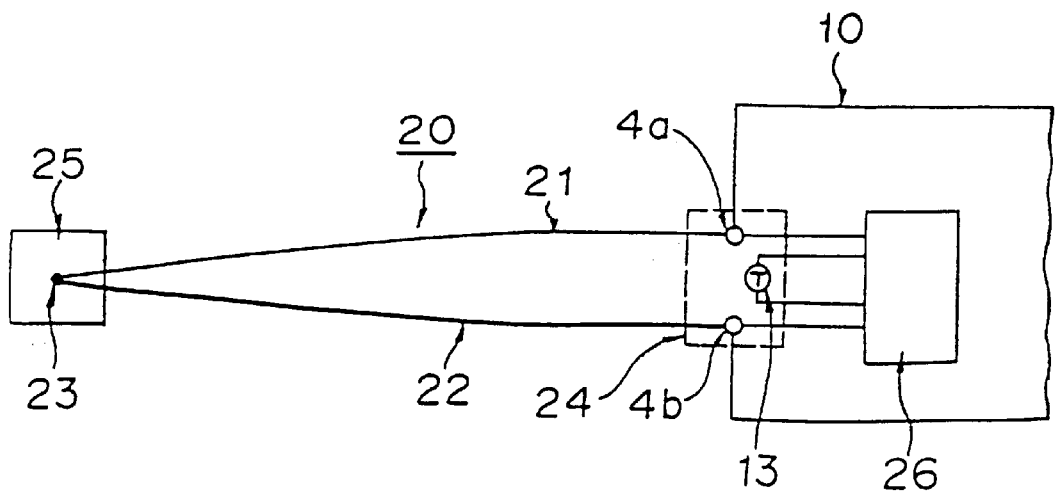
FIG. 4 is a schematic block diagram which is referred to in the explanation of reference junction compensation.

With the illustrated external connection mechanism of temperature-measuring type according to the invention, the temperature-measuring station 7 is a part of the metal piece 2 in tight contact with the electric terminal 4 and bent toward the close vicinity of the electric terminal 4, so that the temperature-measuring station 7 is kept substantially at the same temperature as that of the electric terminal 4. When used, if the temperature sensor 13 carried by the printed-circuit board 1 engages directly the temperature-measuring station 7, the temperature sensor 13 can measure the temperature substantially at the electric terminal 4. Since the output from the temperature sensor 13 is applied to a temperature-responsive circuit of the printed circuit board 1, it is possible to carry out the above-mentioned reference junction compensation in a suitable manner. More specifically, if the terminals 4a, 4b of the reference junction 24 of a thermocouple 20 of FIG. 4 are formed by using two of the electric terminals 4 of the mechanism of the invention, namely, if the opposite ends of the first and second metals 21 and 22 of the thermocouple 20 of FIG. 4 are connected to two electric terminals 4a, 4b of FIG. 1(D), respectively, then the reference junction compensation for the thermocouple 20 can be effected by using the outputs from two temperature sensors 13 which engage the electric terminals 4a and 4b, respectively. In this case, it should be noted that a suitable circuit outside the scope of the invention should be included in the printed-circuit board 1 for calculation of such compensation based on the output from the above-mentioned two temperature sensors 13 mounted thereon.

When it can safely be assumed that the two electric terminals 4a, 4b which are connected to the opposite ends of the first and second metals 21 and 22 of the thermocouple 20 are at the same temperature, the output from that one temperature sensor 13 which engages only one of the two electric terminals 4a and 4b can be used for the purpose of the reference junction compensation.

Thus, the purpose of the invention, i.e., "to provide an external connection mechanism of temperature-measuring type for printed-circuit board", is fulfilled.

In the embodiment of FIG. 1, temperature sensor 13 is of cylindrical shape and its outer surface is a covered by a heat-conductive electric insulation tube 13a. When engaging the temperature-measuring station 7, the insulation tube 13a prevents charges electric or potentials on the temperature-measuring station 7 from moving to the electric circuit of the board 1 through the temperature sensor 13, so as to hinder undesirable interference by such charges or potentials.

The temperature sensor 13 is mounted on one edge of the printed-circuit board 1, and it is preferable to provide a space therebetween as shown in FIG. 1(C) and to avoid bringing them in direct contact with each other, so as to avoid heat transfer between them. With such space, conduction of heat from the printed-circuit board 1, wherein it is generated, toward the temperature sensor 13 is suppressed to a low level, and the structure of the printed-circuit board 1 can be kept simple.

Preferably, the temperature sensor 13 of cylindrical shape is used, and the temperature-measuring station 7 is made in the form of a hollow cylinder with a partially open sidewall by bending one of the two legs of the resilient metal piece 2. In the embodiment of FIG. 1(C), the partial opening of the cylindrical sidewall extends in the longitudinal direction of the cylindrical shape. Whereby, the temperature sensor 13 can be easily mounted on and dismounted from the temperature-measuring station 7 through the partial opening of the sidewall. When the temperature sensor 13 is mounted on the temperature-measuring station 7, the sidewall of the temperature-measuring station 7 resiliently engages the cylindrical surface of the temperature sensor 13 and provides good thermal contact therebetween.

An example of the temperature sensor 13 is a thermistor, a temperature-sensitive diode, or a resistor capable of temperature measurement.

Industrial Applicability

As described in detail in the foregoing, the external connection mechanism of temperature-measuring type for a printed-circuit board according to the invention measures substantially the temperature of individual electric terminal, and it suits the following applications.

(a) To carry out the reference junction compensation by using actual temperature of the related terminal, by measuring the temperature of individual electric terminal for external connection for each printed-circuit board. For instance, even when the reference junctions of a plurality of thermocouples are connected to a number of printed-circuit boards through a plurality of terminals on one common terminal rack, the reference junction compensation for each individual thermocouple can be effected with a high accuracy for each reference junction in response to latest change in its actual temperature.

(b) To measure accurately the actual temperature of individual electric terminals for improving the accuracy of reference junction compensation, by using a combination of a temperature sensor carried by each printed-circuit board and a temperature-measuring station made of resilient metal piece in contact with the electric terminal, which temperature-measuring station is formed in the close vicinity of the electric terminal, so as to engage resiliently with the temperature sensor.

(c) To eliminate influence of heat generated in the printed-circuit board on the temperature sensor, by thermally separating the temperature sensor from the printed-circuit board when mounting the sensor on an edge of the board.

(d) To maintain the simple structure of both the printed-circuit board and the terminal rack, yet facilitating accurate measurement of temperatures at individual electric terminals.

(e) To simplify the maintenance procedure of instruments with printed circuit boards. Conventionally, when replacing the printed-circuit board, it has been necessary to calibrate the characteristics of the related temperature sensor. With the invention, a temperature sensor is secured to each printed-circuit board and the characteristics of the temperature sensor is stored in the printed-circuit board, so that calibration at the time of replacing the printed-circuit board can be eliminated.

(f) To facilitate miniaturization of and high density element loading on instruments using thermocouples, while ensuring reference junction compensation of high accuracy.

We claim:

1. An external connection mechanism of temperature-measuring type for use in a system including an instrument that releasably receives at least one edge of a printed-circuit board and has an insulating terminal base holding electric terminals mounted thereon for external connection of the printed-circuit board, the system further including a thermocouple with two different metals joined together at one ends thereof to form a measuring junction, said two metals having opposite ends connected to two electric terminals on the insulating terminal base of the instrument for connection to the printed circuit board, respectively; the external connection mechanism comprising:

at least one U-shaped resilient metal piece held by the insulating terminal base while being electrically joined with one of the two electrical terminals connected to the thermocouple, respectively, the U-shaped resilient metal piece having two parallel legs for releasably receiving one edge of the printed-circuit board therebetween, a temperature sensor having an outer surface, said temperature sensor held by the one edge of the printed-circuit board and connected to a temperature-responsive circuit of the printed-circuit board, a contact lug formed by bending one of the two legs of the metal piece toward the other leg thereof so as to cause the lug to engage a conductive portion of the printed-circuit board received by the metal piece, and a temperature-measuring station formed by bending root portion of the other one of the two legs of the said metal piece proximate said electric terminal joined with said metal piece, the temperature-measuring station being so positioned and shaped as to engage resiliently said temperature sensor, when the printed-circuit board is received by the metal piece, whereby when the metal piece receives the printed-circuit board, the temperature sensor held by the received printed circuit board resiliently engages the temperature-measuring station and measures temperature in the proximity of said electric terminal joined with said metal piece to produce output that is applied to the temperature-responsive circuit of the printed-circuit board.

2. A mechanism as set forth in claim 1, wherein said external connection mechanism comprises:

two U-shaped resilient metal pieces held by the insulating terminal base while being electrically joined with said two electrical terminals connected to the thermocouple, respectively, each U-shaped resilient metal having two parallel legs for releasably receiving one edge of the printed-circuit board therebetween, two temperature sensors held by said one edge of the printed-circuit board and connected to a temperature-responsive circuit of the printed-circuit board, said temperature sensors having an outer surface, two contact lugs, each of the lugs formed by bending one of the two legs of each metal piece toward the other leg thereof so as to cause the lug to engage a conductive portion of the printed-circuit board received by the metal piece, and two temperature-measuring stations, each of the stations formed by bending root portion of the other one of the two legs of each metal piece proximate said electric terminal joined with the metal piece, the temperature-measuring stations being so positioned and shaped as to engage resiliently said temperature sensors, respectively, when the printed-circuit board is received by the metal piece, whereby when the metal pieces receive the printed-circuit board, the temperature sensors held by the received printed circuit board resiliently engage the temperature-measuring stations and measure temperatures in the proximity of said two electric terminals to produce outputs that are applied to the temperature-responsive circuit of the printed-circuit board.

3. A mechanism as set forth in claim 2, wherein said temperature sensors are secured to the one edge of the printed-circuit board by a thermally insulating member.

4. A mechanism as set forth in claim 3, wherein each of said temperature sensors has an electrically insulating tube fitted on said outer surface and engages said temperature-measuring station without electric connection thereto.

5. A mechanism as set forth in claim 4, wherein each of said temperature sensor has a cylindrical shape, and the temperature-measuring station formed by bending the other leg of the metal piece has a hollow cylindrical shape with a longitudinal opening in sidewall thereof, the temperature-measuring station releasably receiving the temperature sensor through the longitudinal opening in the sidewall, the sidewall of the temperature-measuring station resiliently engageable with the cylindrical temperature sensor for providing tight thermal contact therebetween.

6. A mechanism as set forth in claim 5, wherein each of said temperature sensors has an electrically insulating tube fitted on said outer surface and engages said temperature-measuring station without electric connection thereto.

7. A mechanism as set forth in claim 3, wherein each of said temperature sensor has a cylindrical shape, and the temperature-measuring station formed by bending the other leg of the metal piece has a hollow cylindrical shape with a longitudinal opening in sidewall thereof, the temperature-measuring station releasably receiving the temperature sensor through the longitudinal opening in the sidewall, the sidewall of the temperature-measuring station resiliently engageable with the cylindrical temperature sensor for providing tight thermal contact therebetween.

8. A mechanism as set forth in claim 7, wherein each of said temperature sensors has an electrically insulating tube fitted on said outer surface and engages said temperature-measuring station without electric connection thereto.

9. A mechanism as set forth in claim 2, wherein each of said temperature sensors has an electrically insulating tube fitted on said outer surface and engages said temperature-measuring station without electric connection thereto.

10. A mechanism as set forth set forth in claim 9, wherein each said temperature sensor has a cylindrical shape, and the temperature-measuring station formed by bending the other leg of the metal piece has a hollow cylindrical shape with a longitudinal opening in sidewall thereof, the temperature-measuring station releasably receiving the temperature sensor through the longitudinal opening in the sidewall, the sidewall of the temperature-measuring station resiliently engageable with the cylindrical temperature sensor for providing tight thermal contact therebetween.

11. A mechanism as set forth in claim 10, wherein each of said temperature sensors has an electrically insulating tube fitted on said outer surface and engages said temperature-measuring station without electric connection thereto.

12. A mechanism as set forth in claim 2, wherein each of said temperature sensors has a cylindrical shape, and the temperature-measuring station formed by bending the other leg of the metal piece has a hollow cylindrical shape with a longitudinal opening in sidewall thereof, the temperature-measuring station releasably receiving the temperature sensor through the longitudinal opening in the sidewall, the sidewall of the temperature-measuring station resiliently engageable with the cylindrical temperature sensor for providing tight thermal contact therebetween.

13. A mechanism as set forth in claim 12, wherein each of said temperature sensors has an electrically insulating tube fitted on said outer surface and engages said temperature-measuring station without electric connection thereto.

\* \* \* \* \*